US 6,594,496 B2

(12) United States Patent
Schwartz (10) Patent No.: US 6,594,496 B2
(45) Date of Patent: Jul. 15, 2003

(54) ADAPTIVE CAPACITY MANAGEMENT IN A CENTRALIZED BASESTATION ARCHITECTURE

(75) Inventor: Adam L. Schwartz, Campbell, CA (US)

(73) Assignee: LGC Wireless Inc., San Jose, CA (US)

(*) Notice: Subject to any disclaimer, the term of this patent is extended or adjusted under 35 U.S.C. 154(b) by 52 days.

(21) Appl. No.: 09/965,584

(22) Filed: Sep. 25, 2001

(65) Prior Publication Data

US 2002/0037730 A1 Mar. 28, 2002

Related U.S. Application Data

(62) Division of application No. 09/560,656, filed on Apr. 27, 2000, now abandoned.

(51) Int. Cl.[7] .............................. H04Q 7/20; H04J 3/16
(52) U.S. Cl. ...................... 455/509; 455/452; 455/453; 455/424; 455/67.1; 370/329; 370/437
(58) Field of Search .............................. 455/452, 453, 455/450, 424, 509, 67.1, 423; 370/329, 431, 437

(56) References Cited

U.S. PATENT DOCUMENTS

| 4,256,925 | A | * | 3/1981 | Goode ........................ 370/322 |
| 5,404,574 | A | * | 4/1995 | Benveniste ................. 455/452 |
| 5,448,621 | A | * | 9/1995 | Knudsen ..................... 455/452 |
| 5,475,868 | A | * | 12/1995 | Duque-Anton et al. ..... 455/452 |
| 5,504,937 | A | * | 4/1996 | Kangas ....................... 455/452 |
| 5,758,287 | A | | 5/1998 | Lee et al. ................... 455/450 |
| 5,805,996 | A | | 9/1998 | Salmela ...................... 455/453 |
| 5,809,423 | A | * | 9/1998 | Benveniste ................. 455/452 |
| 5,852,651 | A | | 12/1998 | Fischer et al. ............. 379/56.2 |
| 5,852,778 | A | | 12/1998 | Labedz ....................... 455/423 |
| 5,854,986 | A | | 12/1998 | Dorren et al. .............. 455/562 |
| 5,861,844 | A | | 1/1999 | Gilmore et al. ............ 342/374 |
| 5,890,067 | A | | 3/1999 | Chang et al. ............... 455/446 |
| 5,956,643 | A | * | 9/1999 | Benveniste ................. 455/452 |
| 5,987,055 | A | * | 11/1999 | Duque-Anton et al. ..... 455/446 |
| 6,016,429 | A | * | 1/2000 | Khafizov et al. ........... 455/446 |
| 6,104,930 | A | | 8/2000 | Ward et al. ................. 455/450 |
| 6,115,610 | A | | 9/2000 | Goetz et al. ................ 455/450 |
| 6,223,041 | B1 | * | 4/2001 | Egner et al. ................ 455/452 |
| 6,230,016 | B1 | * | 5/2001 | Benveniste ................. 455/452 |
| 6,353,600 | B1 | * | 3/2002 | Schwartz et al. .......... 455/450 |
| 2002/0037730 | A1 | * | 3/2002 | Schwartz et al. .......... 455/452 |

OTHER PUBLICATIONS

U. Mocci et al; "Adaptive Capacity Management of Virtual Path Networks;" IEEE Globecom 1996. Conference Record (Cat. No. 96CH35942) Part vol. 1 p. 750–4, Publisher IEEE, New York, NY.

\* cited by examiner

Primary Examiner—William Trost
Assistant Examiner—Rafael Perez-Gutierrez
(74) Attorney, Agent, or Firm—Lumen Intellectual Property Services, Inc.

(57) ABSTRACT

A method for reducing the required number of channels needed to serve distributed communication traffic from a centralized capacity resource. The crucial aspect of the system under consideration is that the capacity needs vary as a function of time. Specially, a cellular communication system is described in which the basestations are centrally located and RF channels are diverted, by means of an RF switch, to remotely located cells. The number of traffic channels allocated to each cell is a time dependent offered traffic in the cells and the total number of available channels.

22 Claims, 5 Drawing Sheets

ADAPTIVE CAPACITY MANAGEMENT IN A CENTRALIZED BASESTATION ARCHITECTURE

CROSS-REFERENCE TO RELATED APPLICATIONS

This application is a divisional and claims the benefit of U.S. patent application Ser. No. 09/560,656, filed Apr. 27, 2000, abandoned.

FIELD OF THE INVENTION

This invention relates generally to a system and method for providing communication channels from centrally located cellular basestations to remotely located cells in a way that can significantly reduce the required number of channels needed to serve the remote communication traffic.

BACKGROUND OF THE INVENTION

In a typical cellular communication system, a geographic area is divided into coverage areas called cells. In a cell, cellular traffic is provided by a cellular basestation. The basestation provides radio coverage for a cell through its front end. This basestation's radio coverage establishes RF communication links to and from mobiles users. These communication links are referred to as traffic channels. In this arrangement, the number of radio channels allocated to each cell is fixed. Since each cell must be served by enough channels to meet the peak demand capacity with a specified grade of service or a probability of call blocking, the total number of radio channels required in the system can be quite high. Therefore, the costs can also be high. Also in this arrangement, the overall system efficiency is poor because the demands in certain cells sometimes exceed its peak traffic capacity, causing capacity shortages in some areas and excesses in others. The overall system inefficiency of this nature is common in other communication areas such as data communications, radio coverage, and cellular communication systems. Efforts have been made to solve this problem. In the study of data networks much attention has been focused on providing algorithms that direct data optimally through network to maximize the network's capacity. Typical algorithms will divert data streams from overload network links to other less utilized links to increase the system throughput. One example of such algorithm is given in an article entitled "Adaptive Capacity Management of Virtual Path Networks," by U. Mocci et al., IEEE 1996, page 750–754. This article gives a scheme for allocating physical link capacity among various virtual data path traversing the link. This scheme only improves the efficiency of the network by the virtual paths. The physical links remain fixed. Therefore, the costs of the pre-determined physical links in a virtual path network are still the same.

There also exist inventions related to various aspects of cellular coverage and capacity. Salmela, U.S. Pat. No. 5,805,996, dated Sep. 8, 1998, proposes a method for enhancing coverage to specific areas within a cell by adjusting the direction of one or more antennas. In this case, traffic channels are steered by physically pointing the antennas from neighboring cells into cells with high capacity demand. Hence, additional capacity is provided by neighboring basestations. The system still needs many basestations at the cell's sites. Thus the costs are high and it is not easy to maintain such dispersed basestations.

In Rui, U.S. Pat. No. 5,890,067, dated Mar. 30, 1999, a method for using narrow beam antennas to follow mobile cellular users is disclosed. Different antennas beam widths are used to provide coverage zones for low, medium, and high density traffic areas. This concept is similar to smart antenna systems in which phase-array antenna beams are used to direct coverage to specific mobiles or traffic areas. As mentioned in the above invention, in Salmela's invention, the improvement is limited because capacity is steered locally within a single cell or sector.

In Gilmore, U.S. Pat. No. 5,861,844, dated Jan. 19, 1999, a combine array is used to steer radio coverage from functioning cells or sectors in to a cell or sector wherein a RF transceiver has failed. In this method, RF transceivers from neighboring cells can temporarily provide coverage into those cells with failed transceiver until the failed transceiver can be replaced. Thus this method only improves reliability of coverage but not efficiency and costs.

In Doren, U.S. Pat. No. 5,854,986, dated Dec. 29, 1998, a method for coupling a plurality of transceivers to low power distributed antennas is presented. The purpose is to provide confined coverage in areas with high capacity demands or, alternatively, low capacity coverage holes. Because the coupling is pre-determined statically during installation, this method does not offer a solution to time varying demands.

Finally, Labedz, U.S. Pat. No. 5,852,778, dated Dec. 22, 1998, proposes a method for allowing nearby Code Division Multiple Access (CDMA) cells to expand into coverage area holes caused by a malfunction transmitter. This method is not based on traffic considerations and does not use any RF routing hardware to affect the change in coverage. Again, this method of CDMA cell expansion does not solve any efficiency problem nor does it solve any dynamic coverage demand.

OBJECTS AND ADVANTAGES

The main objective of this invention is to achieve a system sensitive to traffic demands, and capable of switching traffic channels from one cell to another. Based on the information from the traffic demands, the invented system physically assigns channels to cells that have high traffic by borrowing channels from cells that have low traffic demand. In this system, the number of traffic channels in each cell is not fixed anymore. Given cell's peak times do not overlap, the invented system reduces the total number of traffic channels needed to serve the system-wide traffic. Thus the system reduces the required capacity, cuts costs, and dynamically improves overall system efficiency.

Not only does the invented system solve the efficiency, costs, and capacity problems, it is physically different from existing systems.

The key difference between the data network capacity maximizing strategies and the present inventions are that (1) the former treats digital packet-switched data whereas this invention treats RF signals, (2) the former deals with a network with fixed communication links whereas this invention dynamically moves physical links (or traffic channels) among cells, and (3) the optimization method of this invention is unique.

In other systems, there is no routing of traffic channels, no centralization of channel resources, and no attempt to determine optimal allocations of traffic channels.

SUMMARY OF THE INVENTION

An Adaptive Capacity Management System receives information and instructions from a controller and assigns channels to remote cells in such that the total number of channels needed is minimal at a given grade of service (GoS). The system comprises one or more centrally located basestations, a capacity management controller, a router, RF transport means, and RF transceivers. In this arrangement, the basestations provide RF channels and the radio transceivers are located in the cell sites (far away from the basestations) to provide RF coverage. The RF transceivers communicate with the centrally located basestations through RE transport means. If the capacity demands of the system shift from cell to cell over time then the intelligent capacity management system described herein can divert traffic channels to where they are needed. As a result, the present invention substantially reduces the total number of radio channels required to serve the system-wide traffic. Furthermore, in this arrangement, it is easy to operate and maintain the one or more central basestations because they are centrally located.

Four algorithms are invented to use in the Adaptive Capacity Management System to allocate channels to cells. Each algorithm uses a specific metric to minimize the number of channels required to serve the system-wide traffic. These metrics are the worst-case blocking metric, the system blocking metric, the weighted average blocking metric, and the expected number of calls metric.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

System Architecture

A preferred embodiment of the present invention is designed to operate in the context of one or more wireless communication systems providing services to digital cellular telephones, pagers, wireless modems, and other portable or stationary communication devices.

Figure 1:
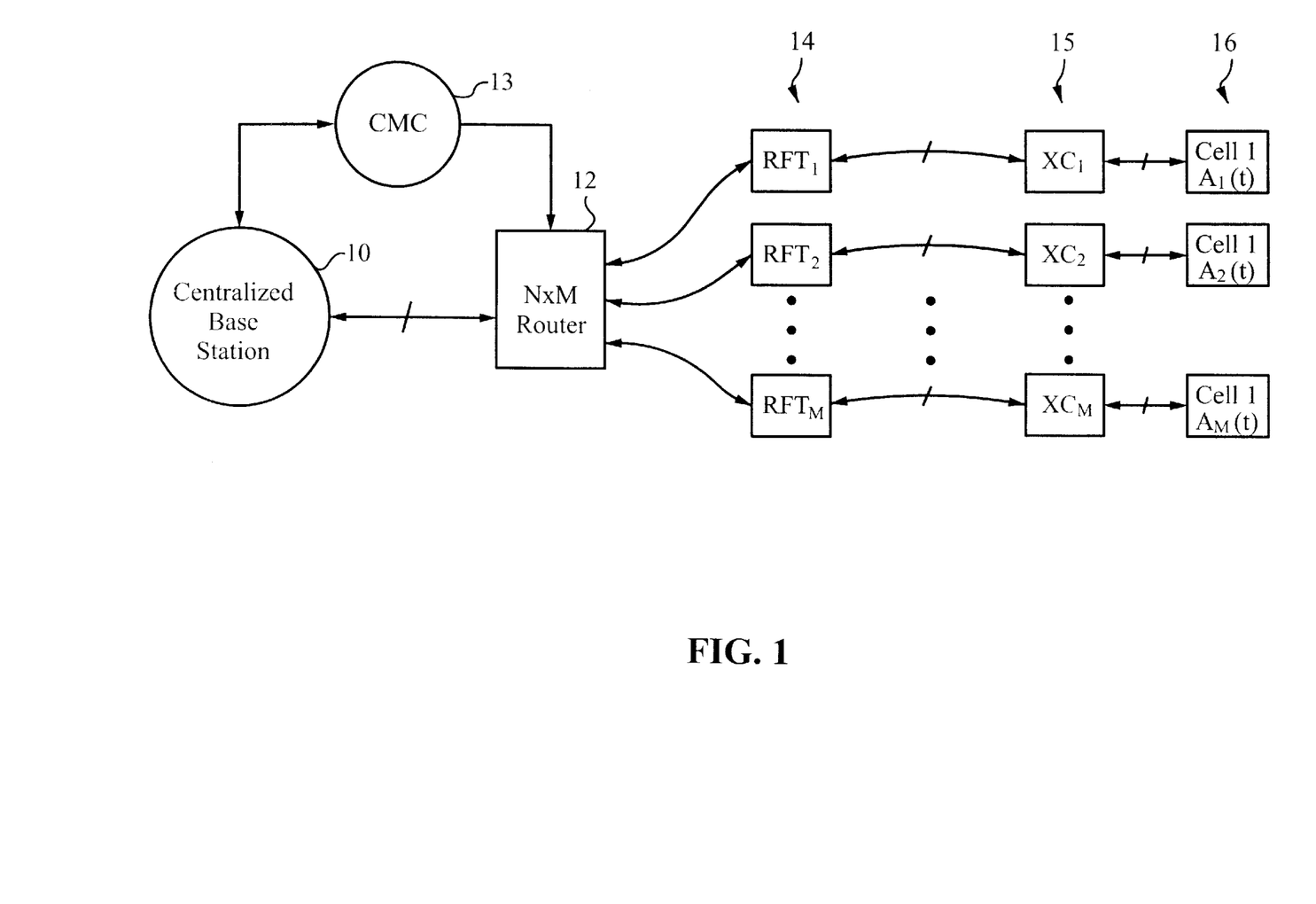
FIG. 1 illustrates a block diagram of an Adaptive Capacity Management System comprising a basestation, a capacity controller, an N×M RF router, M RF Transports, M RF transceivers, and M remote cells.

An example of such system is shown in FIG. 1, a basestation 10 comprises one or more channel supporting radios. In this application, the basestation 10 can include more than one basestations. For clarity, we refer to a basestation but it is to be understood that a system with multiple basestations is within the scope of the present invention. Basestation 10 provides the capacity $N_{max}$ RF channels available to support traffic calls in cells 16. In modern digital cellular systems, each RF channel or radio channel supports multiple traffic channels. For example, in a time division multiple access system (TDMA) a single RF channel supports several timeslots. Each timeslot is a traffic channel. In the preferred embodiment, the RF channels are switched to different cells as needed. In an alternative embodiment, individual traffic channels are switched.

Figure 2:
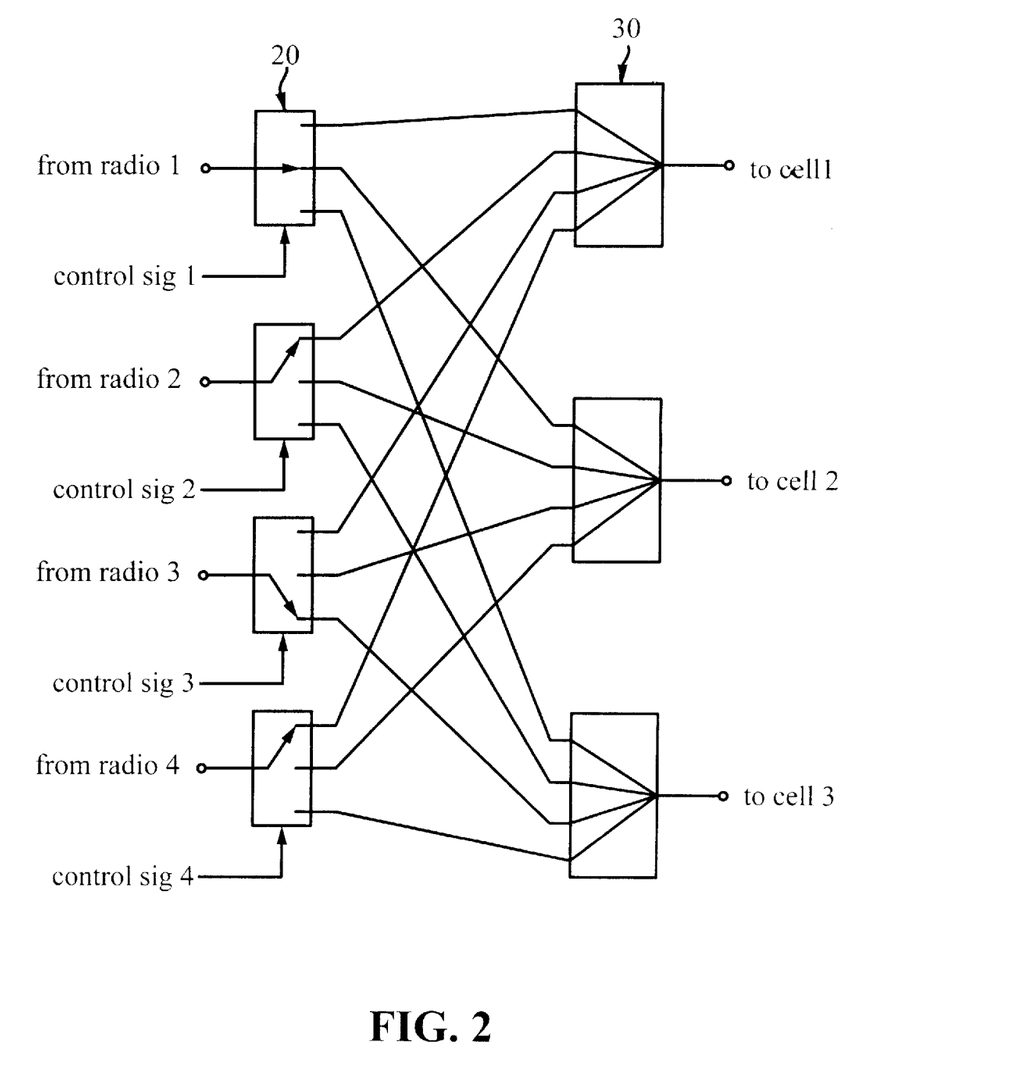
FIG. 2 is a block diagram of a 4×3 switch matrix, corresponding to the N×M RF router in the system block diagram shown in FIG. 1.

As mentioned above, basestation 10 is centrally located to provide $N_{max}$ RF channels to remote cells 16. These channels are connected to RF router 12. The RF router comprises a bank of RF switches 20 (FIG. 2) that are connected to the basestation radios. The switch routes each of the RF channels to one of the three RF combiners 30 (FIG. 2). RF router switches RF channels to remote cells 16 according to the control signal from a capacity management controller 13 (CMC).

FIG. 2 shows an example of FR router 12, an N×M router. In this figure, $N_{max}$ equals to 4 and M equals to 3. Channels $RF_2$ and $RF_4$ are routed to cell 1. $RF_1$ is routed to cell 2 and $RF_3$ is routed to cell 3. Clearly, RF router 12 can be implemented such that not all RF inputs can be switched to any output. This would result in a more economical and more easily implemented design. It should be clear that there exist many other methods for implementing RF router 12.

Figure 3:
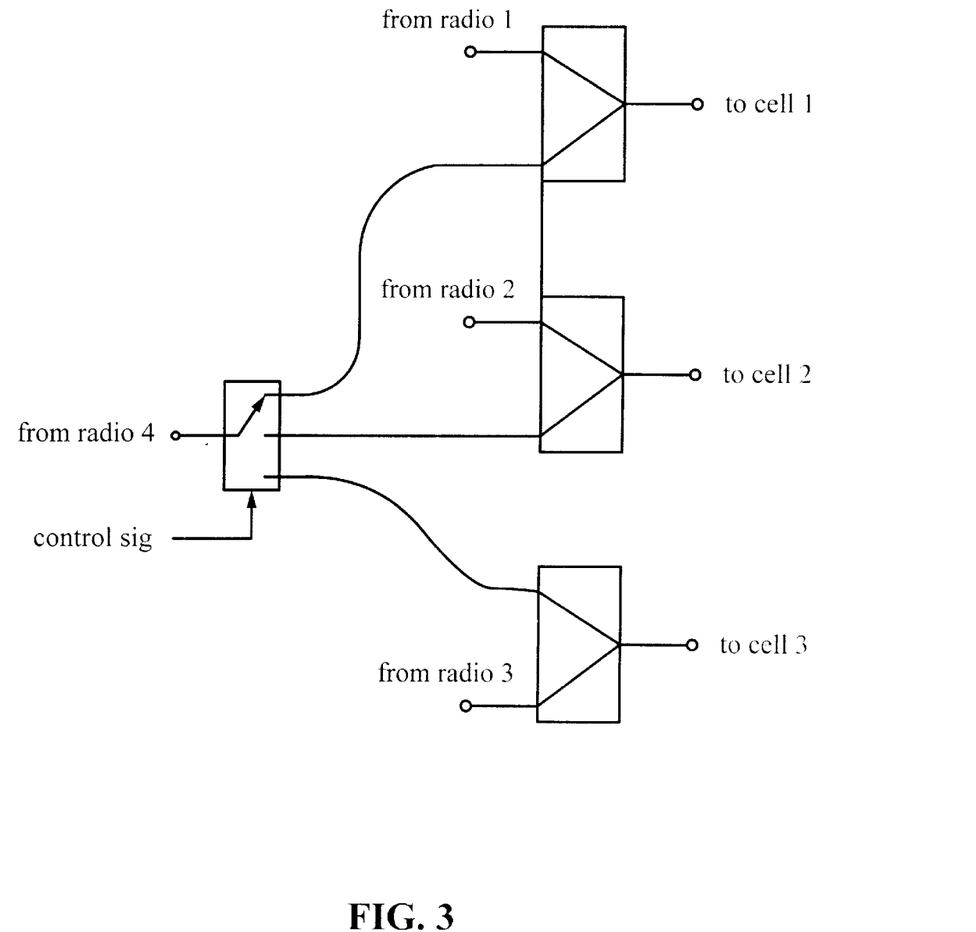
FIG. 3 is a block diagram of an alternative router in which one radio serves as an extra source if traffic capacity that can be switched into one of three cells if needed.

Another example of the RF router is illustrated in FIG. 3 where each of three cells is served by one dedicated channel. When there is a need for additional capacity in any of the three cells, an additional reverse channel is switched to any one of them. For example, as shown in FIG. 3, radio 4 is a dedicated channel to serve cell 1. In case cell 3 needed additional capacity, the channel from radio 4 can be switched to cell 3. This serve channel can also serve as a backup channel in case of one of the dedicated channels does not work. In this case, RF switches are used instead of RF combiners as shown in FIG. 2.

Figure 4:
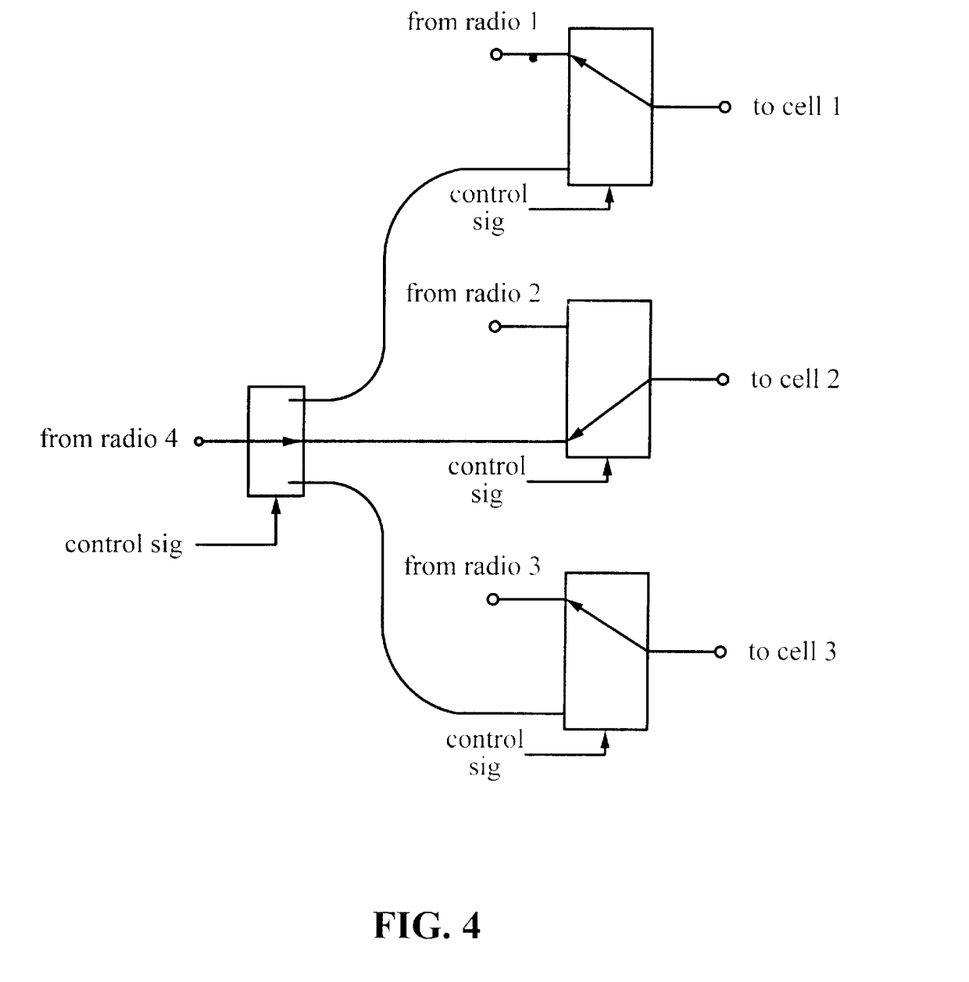
FIG. 4 is a router configuration providing backup for outage of radio 2.

FIG. 4 shows another example of the RF router. In this embodiment, radio 4 is used as a backup and radio 2 is designed to serve cell 2. But when radio 2 is out, cell 2 could switch to radio 4 as a backup.

RF router 12 routes each of the $N_{max}$ channels to RF transports 14 inputs. RF transport 14 could be coaxial cables, frequency channels, optical cables, etc . . . . Both base station 10 and RF router 12 are controlled by a capacity management controller (CMC) 13. Capacity management controller (CMC) 13 monitors traffic from remote cells 16 and/or basestation 10 regarding the traffic demand $A_i(t)$ in the $i^{th}$ cell, i=1, 2, . . . , M, at time t. Based on this information and the total number of available channels, $N_{max}$, CMC 13 orders the RF router 12 to provide the $N_i(t)$ channels to the $i^{th}$ cell. The number of channels serving all cells is a time-dependent vector, and can be written as follows:

$$N(t) = [N_1(t), N_2(t), \ldots, N_M(t)] \text{ with } \sum_{i=1}^{M} N_i(t) \le N_{max}$$

RF signal transport means 14 connect RF router 12 to radio transceivers 15 then to cells 16. There are many possibilities for the signal transport means 14. One such solution, well-known in the art, is to AM modulate laser light with the RF signals and transmit this modulated light through single-mode fiber. At the far end of the fiber the optical signal is converted back to an RF signal using a photo-detector. Clearly, any transport mechanism which reproduces at its output the input RF signals will work.

Radio transceivers 15 are located in the vicinity of cells 16. Radio transceiver 15 comprises M transceivers, denoted as $XC_1, XC_2, \ldots, XC_M$. Radio transceiver $XC_i$ communicates to the $i^{th}$ cell of cells 16. For example, radio transceiver $XC_1$ communicates to $C_1$; $XC_2$ to $C_2$, and $XC_M$ to $C_M$. $XC_i$ takes signal from an output of RF transport 14 and radiates them into cell $C_i$. Conversely, $XC_i$ receives signals containing information from cellular units within the cell and transmits them back through RF transport means 14 and RF router 12 back to the basestation. In this way, a bi-directional communication link is established. For simplicity we refer to this bi-directional communication link as a traffic channel. Consequently, the radio transceivers, the RF transport, and the RF router are all bi-directional.

Capacity management controller (CMC) 13 uses an algorithm to judiciously assign channels to cells 16 to maximize the quality of service to the system given the available number $N_{max}$ of channels available.

RF switches 20 (FIG. 2) are controlled by the capacity management controller (CMC) 13, shown in FIG. 1. The capacity management controller (CMC) makes decisions on how to route traffic channels based on the following factors:

1. The number $N_{max}$ of available traffic channels,
2. The offered traffic (also called traffic intensity), $A_i(t)$, in each cell as measured by the basestations 10,
3. The current allocation of traffic channels,
4. Restrictions on which channels can serve which cells. These restrictions can arise from many factors such as adjacent channel interference and neighboring cell interference.

Figure 5:
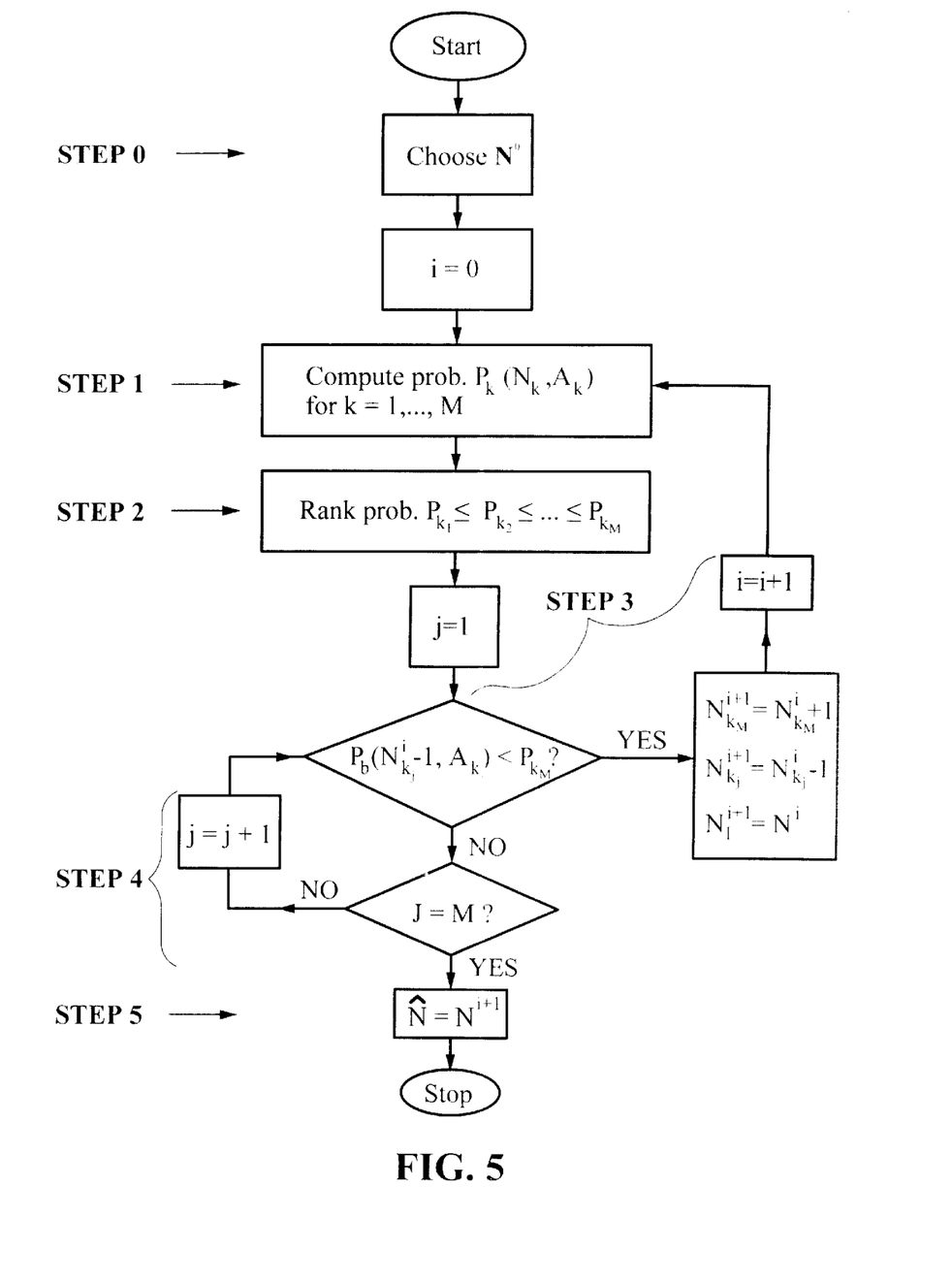
FIG. 5 is a flow chart of an optimization algorithm for the worst-case blocking metric to reduce the number of assigned channels to cells.

Based on this information, capacity management controller (CMC) 13 uses one of the invented algorithms to route unused traffic channels to cells that require additional channels. FIG. 5 shows a flow chart for the optimization steps to assign channels to cells using the worst-case blocking metric. This ability can reduce the total number of traffic channels needed to provide a specified grade of service to the cellular system.

Theory of Operation

Typically, a communication system is characterized by two main quantities. The first quantity is the offered traffic vector A representing the offered traffic in each cell at certain time. A can be denoted as follows:

$A = [A_1, A_2, \ldots, A_M]$ wherein $A_i$ is a positive, real number representing the offered traffic in the $i^{th}$ cell.

The second quantity is the traffic channel vector N representing the number of channels assigned to each cell. N can be represented as follows:

$$N = N(t) = [N_1(t), N_2(t), \ldots, N_M(t)] \in \Sigma_{N_{max}}$$

and $$\sum_{N_{max}} \equiv \left\{ N \in N^M, N_i \geq 0 \, \Big| \, \sum_{i=1}^{M} N_i \leq N_{max} \right\}$$

where $N_i$ represents the number of traffic channel allocated to $i^{th}$ cell. Both A and N vary with time.

These two quantities can be used to calculate the blocking probability $P_b(A_i, N_i)$ by using he Erlang B model:

$$P_b(A_i, N_i) = \frac{\frac{A_i^{N_i}}{N_i!}}{\sum_{k=0}^{N_i} \frac{A_i^k}{k!}} \quad \text{(Eq. 1)}$$

The Erlang B formula determines the probability that a call is blocked in a cell, and is a common measure of the Grade of Service (GoS) for an individual cell.

In a first formulation of the problem solved by the present system, the system will assign $N_i(t) \geq 0$ traffic channels to the $i^{th}$ cell $C_i$ such that $$\sum_{i=1}^{M} N_i(t) \leq N_{max}$$

to minimize the maximum blocking probability in each cell of a blocked call. In the following description, each traffic channel is assigned to only one cell. However, other embodiments of this invention allow single channels to be assigned to multiple cells.

There are different ways to optimize the number of channels assigned to cells. Four metrics are presented below. Each leads to different optimal allocations of RF channels.

Optimal Channel Allocations

The optimal allocation of traffic channels among different cells depends on how system performance is measured. We present four metrics, each of which leads to a different capacity maximizing objective. In what follows, A and N represent the offered load and number of traffic channels in each cell respectively. Again A and N are functions of time although for clarity of presentation we do not make this dependence explicit in the notation.

Worst-Case Blocking:

The first metric is simply the maximum blocking probability of any cell in the system. For the $i^{th}$ cell, let $B_i$ be the blocking probability. Then, for offered traffic $A_i$ and number of traffic channels $N_i$, $B_i$ is given by the Erlang B formula, Eq. 1.

The worst-case blocking problem in the system is defined as $$B^1(N, A) = \max_{i=1,2,\ldots,M} B_i = \max_{i=1,2,\ldots,M} P_b(N_i, A_i)$$

Let $\hat{N}$ be an assignment of traffic channels that minimizes this criterion, i.e.

$$\hat{N} = \arg \min_{N \in \Sigma_N} B^1(N, A)$$

Then it can be shown that $$P_b(\hat{N}_i - 1, A_i) \geq P_b(\hat{N}_{\hat{j}}, \hat{A}_{\hat{i}}), \hat{j} \in J_{\hat{N}}, \forall \, i = 1, \ldots, M$$

where the set $$J_{\hat{N}} = \arg\max_{j=1,\ldots,M} P_b(\hat{N}_i, A_i) \subseteq \{1, \ldots, M\}$$

The invented optimization algorithm for finding the vector N that optimizes this metric comprises of the following steps:

Mini-max Channel Allocation Algorithm:
The following steps are also referred to FIG. 5.

Step 0: Choose $N^0 \in \Sigma_{N_{max}}$. Set i=0.

Step 1: For k=1, ..., M, compute $P_k \in P_t(N_k^i, A_k)$.

Step 2: Choose $k_j \in \{1, \ldots, M\}$, j=1, ..., M such that $k_j \neq k_i$ if $j \neq l$ and $P_{k_1} \leq P_{k_2} \leq \ldots \leq P_{k_M}$. That is, sort the blocking probabilities in ascending order to find maximum blocking probability. Call the cell that has worst blocking probability a worst-case cell.

Step 3: Find a donor cell that satisfies the following criterion $P_C(N_k^i - 1, A_k) < P_{k_M}$.

Define for l=1,2, ..., M $$N_l^{i+1} = \begin{cases} N_l^i + 1 & \text{if } l = k_M \\ N_l^i - 1 & \text{if } l = k_j \\ N^i & \text{if otherwise} \end{cases}$$

Let i=i+1 and go to step 1. This step removes a channel from a cell with low blocking probability and gives to a cell with the worst blocking probability and compare to see if the maximum blocking probability is reduced. Otherwise skip to step 5.

Step 4: Set j=j+1. If j=M go to step 5, otherwise go to step 3.

Step 5: Set $\hat{N} = N^{i=1}$ and stop.

It is proven that this mini-max channel allocation algorithm will assign traffic channels in a way that minimizes the maximum blocking probability of any cell.

The second metric used to optimize channel allocation is called the average-blocking metric.

Average Blocking:
We can define the expected number of blocked calls in the system as a metric. To this end, we weight the blocking probability in each cell by the number of channels serving that cell:

$$B^2(N, A) = \frac{1}{M} \sum_{i=1}^{M} N_i P_b(N_i, A_i)$$

The 1/M is used to normalize by the number of cells.
An optimal channel is achieved:

$$\hat{N} = \arg\min_{N \in \Sigma_N} B^2(N, A)$$

if the following sufficient condition is satisfied:

$$(\hat{N}_i - 1)P_b(\hat{N}_i - 1, \hat{A}_i) + (\hat{N}_j + 1)P_b(\hat{N}_j + 1, A_j) \geq \hat{N}_i P_b(\hat{N}_i, A_i) + \hat{N}_j P_b(\hat{N}_j, A_j) \forall i, j = 1, \ldots, M$$

An algorithm similar to the mini-max channel allocation algorithm can be employed to minimize the average blocking.

The third metric used to optimize channel allocation is called the system-blocking metric.

System Blocking:
Another way to look at the capacity in the system is to consider the system-wide probability of blocking, that is, the probability that a call will be blocked in any of the M cells. The probability that a call is blocked in any of the cells is equal to one minus the probability that no call is blocked in any cell. Thus, a third metric $B^3$ is given by $$B^3(N, A) = 1 - \prod_{i=1}^{M} (1 - P_b(N_i, A_i))$$

The minimal number of channels assigned is achieved $$\hat{N} = \arg\max_{N \in \Sigma_N} B^3(N, A)$$

if the following sufficient condition is met $$\left(\frac{1 - P_b(N_i - \hat{1}, A_i)}{1 - P_b(N_i, \hat{A}_i)}\right)\left(\frac{1 - P_b(N_j + \hat{1}, A_j)}{1 - P_b(N_j, \hat{A}_j)}\right) <= 1 \ \forall i, j = 1, \ldots, M$$

An algorithm similar to the mini-max channel allocation algorithm can be employed to minimize the system blocking probability.

The fourth metric used to optimize channel allocation is called the expected number of call metric.

Expected Number of Calls:
Choosing N to minimize one of the above metrics does not generally lead to the maximum expected number of calls in the system. Maximum number of expected calls can be defined in terms of a metric $B^4$ as:

$$B^4(N, A) = \sum_{i=1}^{M} C(N_i, A_i)$$

where i=1, ..., M

Where $C(N_i, A_i)$ is the expected number of calls in cell i and given by $$C(N_i, A_i) = \sum_{k=0}^{N_i} k p_k(N_i, A_i)$$

$$p_0(N_i, A_i) = \left[\sum_{k=0}^{N_i} \frac{A_i^k}{k!}\right]^{-1}$$

$$p_k(N_i, A_i) = p_0(N_i, A_i) \frac{A_i^k}{k!}$$

with $p_k(.\,,\,.)$ is the probability of k calls.

The maximum number of expected call is achieved:

$$\hat{N} = \arg\max_{N \in \Sigma_N} B^4(N, A)$$

if the sufficient condition for optimality is met $$C(\hat{N}_i - 1, A_i) + C(\hat{N}_j + 1, A_j) \leq C(\hat{N}_i, A_i) + C(N_j, A_j) \forall i, j = 1, \ldots, M$$

An algorithm similar to the mini-max channel algorithm can be employed to minimize the expected number of call blocking.

Any of the four metrics defined above can be used to select optimal channel allocations for each cell. That is for each metric, given a traffic distribution A, we can choose N to minimize or maximize that metric. Define the optimal solution by $$\hat{N}^j = \underset{N \in \Sigma_N}{\arg\min} B^j(N, A),$$

where j=1,2,3 . . . for minimizing blocking probabilities or $$\hat{N}^4 = \underset{N \in \Sigma_N}{\arg\max} B^4(N, A)$$

for maximizing expected calls.

Where, again $$\sum_N = \left\{ N \in N^M, N_i \geq 0 \middle| \sum_{i=1}^M N_i \leq N \right\}$$

The above methods are the characterization of Optimal Solutions.

ALTERNATIVE EMBODIMENTS

Other embodiments of this invention are possible. The basestations can be one basestation or a cluster of basestations. In one case, the RF router is designed to switch traffic channels on a timeslot basis rather than switching the RF channel as a whole. This would allow finer resolution over amount of capacity switched between cells. In another case, multiple RF channels are combined first, before entering the RF router. Then they are switched together from cell to cell. In yet another case, the traffic signals are routed to and from the remote sites in a form other than RF signals. For instance, the traffic information could be formatted as a digital bit stream and transferred as a data through a digital network. In this case, the RF router would be replaced by a digital switch. In yet another case, the RF router could be replaced by an optical router.

What is claimed is:

1. An adaptive capacity management system for a communication system, said adaptive capacity management system comprising:
    (a) one or more centralized basestations for providing channels to remote cells;
    (b) a router positioned to receive said channels from said basestations and to selectively route said channels among said remote cells; and
    (c) a capacity management controller in communication with said router and with said basestations for optimally allocating said channels among said remote cells, said capacity management controller utilizes one of system capacity metrics to achieve a capacity maximizing objective, wherein said system capacity metrics comprising:

a worst-case blocking, $B^1(N, A) = \underset{i=1,2,\ldots M}{\max} B_i = \underset{i=1,2,\ldots M}{\max} P_b(N_i, A_i),$ an average blocking, $B^2(N, A) = \dfrac{1}{M} \sum_{i=1}^M N_i P_b(N_i, A_i),$ a system blocking, $B^3(N, A) = 1 - \prod_{i=1}^M (1 - P_b(N_i, A_i)),$ and an expected number of calls, $B^4(N, A) = \sum_{i=1}^M C(N_i, A_i),$ wherein A and N represent offered traffic load and number of traffic channels in each cell, respectively, B represents blocking probability, $P_b(N,A)$ represents probability of a blocked call when N channels are used to serve A, and C(N,A) represents expected number of calls when N channels are used to serve A.

2. The system of claim 1, wherein said router switches a multiple of traffic channels among said cells in accordance with a control signal received from said capacity management controller.

3. The system of claim 1, wherein said channels are RF channels, and wherein each of said channels comprises a plurality of traffic channels.

4. The system of claim 1, wherein said router comprises switches and combiners.

5. The system of claim 4, wherein said switches route each of said channels received from said basestations to said combiners.

6. The system of claim 1, wherein said router switches on a time-slot basis.

7. The system of claim 1, wherein said router is an optical router.

8. The system of claim 1, wherein said router is an RE router.

9. A method of allocating traffic channels to cells in an Adaptive Capacity Management System, wherein said System comprises at least one centrally located basestation capable of providing said channels to said cells, a router means coupled to said basestation and capable of routing said channels to said cells, and a capacity management controller means coupled to said basestation and said router means, said method being implemented in said capacity management controller means comprising the steps of:
    dynamically optimizing channel allocations for each of said cells based on one of system capacity metrics, wherein said system capacity metrics measure a worst-case blocking, $B^1(N, A) = \underset{i=1,2,\ldots M}{\max} B_i = \underset{i=1,2,\ldots M}{\max} P_b(N_i, A_i),$ an average blocking, $B^2(N, A) = \dfrac{1}{M} \sum_{i=1}^M N_i P_b(N_i, A_i),$ a system blocking, $B^3(N, A) = 1 - \prod_{i=1}^M (1 - P_b(N_i, A_i)),$ and an expected number of calls, $B^4(N, A) = \sum_{i=1}^M C(N_i, A_i),$ wherein A and N represent offered traffic load and number of traffic channels in each cell, respectively, B represents blocking probability, $P_b(N,A)$ represents probability of a blocked call when N channels are used to serve A, and C(N,A) represents expected number of calls when N channels are used to serve A.

10. The method of claim 9, wherein said dynamically optimizing channel allocations step comprises the steps of measuring and minimizing said worst-case blocking probability.

11. The method of claim 10, further comprising the following steps:
    (a) selecting a channel allocation vector N to said cells, wherein an $I^{th}$ component of said vector N is a number of channels $N_i$ assigned to an $I^{th}$ of said cells;
    (b) calculating a blocking probability $P_b(N_i, A_i)$ for each said cell, wherein $A_i$ is an offered traffic load;
    (c) finding a worst-case cell having a worst-case blocking probability $P_{max}$;

(d) locating a donor cell d having said blocking probability $P_b(N_d,A_d)$, wherein said donor cell d satisfies the following criterion: $P_b(N_d-1,A_d)<P_{max}$;

(e) donating one channel of said channels from said donor cell to said worst-case cell; and (f) repeating steps (b), (c), (d), and (e) until said criterion cannot be satisfied.

12. The method of claim 9, wherein said dynamically optimizing channel allocations step comprises the steps of measuring and minimizing a probability of said system blocking.

13. The method of claim 12, further comprising the following steps:

(a) selecting a channel allocation vector N to said cells, wherein an $i^{th}$ component of said vector N is a number of channels $N_i$ assigned to an $i^{th}$ of said cells;

(b) calculating $D_i=[1-P_b(N_i,A_i)]/[1-P_b(N_i-1,A_i)]$ for each cell with $N_i>1$ and $R_i=[1-P_b(N_i,1,A_i)]/[1-P_b(N_i,A_i)]$ for each cell, wherein $D_i$ is cost of removing one channel from cell i, $P_b$ is a blocking probability, $R_i$ is benefit of adding one channel to cell i, and $A_i$ is an offered traffic load;

(c) finding a donor cell m with smallest $D_m$;

(d) locating a receiver cell n with largest $R_n$ where the following criterion: $R_n/D_m>1$ is satisfied;

(e) donating one channel from said donor cell to said receiver cell; and (f) repeating steps (b), (c), (d) and (e) until said criterion cannot be satisfied.

14. The method of claim 9, wherein said dynamically optimizing channel allocations step comprises the steps of measuring and minimizing said average blocking.

15. The method of claim 14, further comprising the following steps:

(a) selecting a channel allocation vector N to said cells, wherein an $I^{th}$ component of said vector N is a number of channels $N_i$ assigned to an $I^{th}$ said cells;

(b) calculating $D_i=(N_i-1)P_b(N_i-1,A_i)-N_iP_b(N_i,A_i)$ for each cell with $N_i>1$ and $R_i=N_iP_b(N_i,A_i)-(N_i)P_b(N_i,1,A_i)$ for each cell, wherein $D_i$ is cost of removing one channel from cell i, $P_b$ is a blocking probability, $R_i$ is benefit of adding one channel to cell i, and $A_i$ is an offered traffic load;

(c) finding a donor cell m with smallest $D_m$;

(d) locating a receiver cell n with largest $R_n$ where the following criterion: $D_m-R_n<0$ is satisfied;

(e) donating one channel from said donor cell to said receiver cell; and (f) repeating steps (b), (c), (d) and (e) until said criterion cannot be satisfied.

16. The method of claim 9, wherein said dynamically optimizing channel allocations step comprises the steps of measuring and maximizing said expected number of calls.

17. The method of claim 16, further comprising the following steps:

(a) selecting a channel allocation vector N to said cells, wherein an $i^{th}$ component of said vector N is a number of channels $N_i$ assigned to an $i^{th}$ of said cells;

(b) calculating $$D_i = \sum_{k=0}^{N_i} kp_k(N_i, A_i) - \sum_{k=0}^{N_i-1} kp_k(N_i - 1, A_i)$$

for each cell where $p_k()$ is the probability of k calls and $$R_i = \sum_{k=0}^{N_i+1} kp_k(N_i + 1, A_i) - \sum_{k=0}^{N_i} kp_k(N_i, A_i)$$

for each cell where $p_k()$ is the probability of k calls, wherein $D_i$ is cost of removing one channel from cell i, $R_i$ is benefit of adding one channel to cell i, and $A_i$ is an offered traffic load;

(c) finding a donor cell m with smallest $D_m$;

(d) locating a receiver cell n with largest $R_n$ where the following criterion $R_n-D_m>0$ is satisfied;

(e) donating one channel from said donor cell to said receiver cell; and (f) repeating steps (b), (c), (d) and (e) until said criterion cannot be satisfied.

18. A method of allocating traffic channels to cells, said method being implemented in a centrally located basestation comprises the step of dynamically optimizing a system capacity metric that measures and maximizes expected number of calls, wherein said dynamically optimizing step further comprises the steps of:

(a) selecting a channel allocation vector N to said cells, wherein an $i^{th}$ component of said vector N is a number of channels $N^i$ assigned to an $i^{th}$ of said cells;

(b) calculating $$D_i = \sum_{k=0}^{N_i} kp_k(N_i, A_i) - \sum_{k=0}^{N_i-1} kp_k(N_i - 1, A_i)$$

for each cell where $p_k()$ is the probability of k calls and $$R_i = \sum_{k=0}^{N_i+1} kp_k(N_i + 1, A_i) - \sum_{k=0}^{N_i} kp_k(N_i, A_i)$$

for each cell where $p_k()$ is the probability of k calls, wherein $D_i$ is cost of removing one channel from cell i, $R_i$ is benefit of adding one channel to cell i, and $A_i$ is an offered traffic load;

(c) finding a donor cell m with smallest $D_m$;

(d) locating a receiver cell n with largest $R_n$ where the following criterion $R_n-D_m>0$ is satisfied;

(e) donating one channel from said donor cell to said receiver cell; and (f) repeating steps (b), (c), (d) and (e) until said criterion cannot be satisfied.

19. A method of allocating traffic channels to cells, said method being implemented in a centrally located basestation comprises the step of dynamically optimizing a system capacity metric that measures and minimizes average blocking, wherein said dynamically optimizing step further comprises the steps of:

(a) selecting a channel allocation vector N to said cells, wherein an $i^{th}$ component of said vector N is a number of channels $N_i$ assigned to an $i^{th}$ of said cells;

(b) calculating $D_i=(N_i-1)P_b(N_i-1,A_i)-(N_iP_b(N_i,A_i))$ for each cell with $N_i>1$ and $R_i=N_iP_b(N_i,A_i)-(N_i+1)P_b(N_i+1,A_i)$ for each cell, wherein $D_i$ is cost of removing one channel from cell i, $P_b$ is a blocking probability, $R_i$ is benefit of adding one channel to cell i, and $A_i$ is an offered traffic load;

(c) finding a donor cell m with smallest $D_m$;

(d) locating a receiver cell n with largest $R_n$ where the following criterion: $D_m-R_n<0$ is satisfied;

(e) donating one channel from said donor cell to said receiver cell; and (f) repeating steps (b), (c), (d) and (e) until said criterion cannot be satisfied.

20. A method of allocating traffic channels to cells, said method being implemented in a centrally located basestation comprises the step of dynamically optimizing a system capacity metric that measures and minimizes system blocking, wherein said dynamically optimizing step further comprises the steps of:

(a) selecting a channel allocation vector N to said cells, wherein an $i^{th}$ component of said vector N is a number of channels $N_i$ assigned to an $i^{th}$ of said cells;

(b) calculating $D_i=[1-P_b(N_i,A_i)]/[1-P_b(N_i-1,A_i)]$ for each cell with $N_i>1$ and $R_i=[1-P_b(N_i+1,A_i)]/[1-P_b(N_i,A_i)]$ for each cell, wherein $D_i$ is cost of removing one channel from cell i, $P_b$ is a blocking probability, $R_i$ is benefit of adding one channel to cell i, and $A_i$ is an offered traffic load;

(c) finding a donor cell m with smallest $D_m$;

(d) locating a receiver cell n with largest $R_n$ where the following criterion: $R_n/D_m>1$ is satisfied;

(e) donating one channel from said donor cell to said receiver cell; and (f) repeating steps (b), (c), (d) and (e) until said criterion cannot be satisfied.

21. A method of allocating traffic channels to cells in an Adaptive Capacity Management System, wherein said System comprises at least one centrally located basestation, a router means coupled to said basestation, and a capacity management controller means coupled to said basestation and said router means, said method being implemented in said capacity management controller means comprising the steps of:

(a) selecting a channel allocation vector to said cells, wherein each component of said vector corresponds to a number of channels assigned to one of said cells;

(b) calculating a blocking probability for each of said cells;

(c) finding a blocked cell based on said calculating step;

(d) locating a donor cell that satisfies an optimization criterion;

(e) donating one channel from said donor cell to said blocked cell; and (f) repeating steps (b), (c), (d), and (e) until no more cell satisfies said optimization criterion such that said number of channels assigned to each of said cells is minimized.

22. A method of allocating traffic channels to cells, said method being implemented in a centrally located basestation comprises the step of dynamically optimizing a system capacity metric that measures worst-case blocking, wherein said optimizing step further comprises the steps of:

(a) selecting a channel allocation vector N to said cells, wherein an $I^{th}$ component of said vector N is a number of channels $N_i$ assigned to an $I^{th}$ of said cells;

(b) calculating a blocking probability $P_b(N_i,A_i)$ for each said cell, wherein $A_i$ is an offered traffic load;

(c) finding a worst-case cell having a worst-case blocking probability $P_{max}$;

(d) locating a donor cell d having said blocking is probability $P_b(N_d,A_d)$, wherein said donor cell d satisfies the following criterion: $P_b(N_d-1,A_d)<P_{max}$ (e) donating one channel from said donor cell to said worst-case cell; and (f) repeating steps (b), (c), (d), and (e) until said criterion cannot be satisfied.

\* \* \* \* \*